(12) United States Patent
Serino

(10) Patent No.: US 11,185,092 B2
(45) Date of Patent: Nov. 30, 2021

(54) POWDERED EMULSION FOR ANIMAL FEED

(71) Applicant: SEVECOM S.P.A., Milan (IT)

(72) Inventor: Nazzaro Serino, Milan (IT)

(73) Assignee: SEVECOM S.P.A., Milan (IT)

( * ) Notice: Subject to any disclaimer, the term of this patent is extended or adjusted under 35 U.S.C. 154(b) by 331 days.

(21) Appl. No.: 15/328,273

(22) PCT Filed: Jun. 25, 2015

(86) PCT No.: PCT/IB2015/054782
§ 371 (c)(1),
(2) Date: Jan. 23, 2017

(87) PCT Pub. No.: WO2016/012881
PCT Pub. Date: Jan. 28, 2016

(65) Prior Publication Data
US 2017/0215457 A1    Aug. 3, 2017

(30) Foreign Application Priority Data
Jul. 21, 2014 (IT) ............................. MI2014A1326

(51) Int. Cl.
| A23K 20/10 | (2016.01) |
| A23K 10/37 | (2016.01) |
| A23K 20/28 | (2016.01) |
| A23K 40/10 | (2016.01) |
| A23K 20/158 | (2016.01) |

(52) U.S. Cl.
CPC ............. *A23K 20/10* (2016.05); *A23K 10/37* (2016.05); *A23K 20/158* (2016.05); *A23K 20/28* (2016.05); *A23K 40/10* (2016.05); *Y02P 60/87* (2015.11)

(58) Field of Classification Search
None
See application file for complete search history.

(56) References Cited

U.S. PATENT DOCUMENTS

| 4,680,315 A * | 7/1987 | Bezzegh ............. A61K 31/047 514/738 |
| 4,701,331 A | 10/1987 | Grabitz |
| 4,749,577 A | 6/1988 | Voege et al. |
| 5,457,128 A | 10/1995 | Yanagawa |
| 6,083,520 A | 7/2000 | Toneby |
| 6,379,723 B1 | 4/2002 | Samuelsson |
| 6,482,463 B1 | 11/2002 | Mologni et al. |
| 7,160,557 B2 | 1/2007 | Bernstein et al. |
| 7,169,424 B2 | 1/2007 | Antony et al. |
| 10,226,503 B2 | 3/2019 | Ling |
| 2003/0044448 A1 | 3/2003 | Myers et al. |
| 2004/0018217 A1 | 1/2004 | Crepeau et al. |
| 2004/0076659 A1* | 4/2004 | Shelford ................ A23K 40/30 424/442 |
| 2004/0202696 A1 | 10/2004 | Yamin et al. |
| 2005/0022328 A1 | 2/2005 | Weihrauch et al. |
| 2006/0008533 A1* | 1/2006 | Habich .................. A61K 8/678 424/489 |
| 2006/0036419 A1 | 2/2006 | Cook et al. |
| 2009/0186767 A1 | 7/2009 | Arbogast et al. |
| 2009/0297686 A1 | 12/2009 | Pablos |
| 2010/0311846 A1 | 12/2010 | Bendiner et al. |
| 2011/0009374 A1 | 1/2011 | Keller |
| 2011/0070327 A1 | 3/2011 | Wolf et al. |
| 2011/0104266 A1 | 5/2011 | Guimberteau et al. |
| 2011/0200705 A1 | 8/2011 | Tricarico et al. |
| 2012/0148718 A1 | 6/2012 | Wilson et al. |
| 2014/0113057 A1 | 4/2014 | Nazzaro |
| 2014/0127384 A1* | 5/2014 | Nazzaro ................. A23K 40/00 426/601 |
| 2016/0037804 A1 | 2/2016 | Serino |
| 2017/0013862 A1 | 1/2017 | Serino |
| 2020/0000793 A1 | 1/2020 | Falo, Jr. et al. |
| 2020/0063198 A1 | 2/2020 | Blainey et al. |
| 2020/0359654 A1 | 11/2020 | Serino |

FOREIGN PATENT DOCUMENTS

| BR | 9507457 A | 9/1997 |
| BR | 9509305 A | 12/1997 |
| BR | 9910340 A | 1/2001 |
| CL | 38112 | 8/2012 |
| CL | 201602530 A | 3/2017 |
| CN | 1162909 A | 10/1997 |
| CN | 1302185 A | 7/2001 |
| CN | 1089558 C | 8/2002 |
| CN | 1196410 C | 4/2005 |
| CN | 101043819 A | 9/2007 |
| CN | 103619189 A | 3/2014 |
| DE | 102006033845 A1 | 1/2008 |
| EA | 201391677 A1 | 5/2014 |
| EP | 0197188 A1 | 10/1986 |
| EP | 0363733 A2 | 4/1990 |
| EP | 0516099 A1 | 12/1992 |
| EP | 0755195 A1 | 1/1997 |
| EP | 1151755 A1 | 11/2001 |
| EP | 1800546 A1 | 6/2007 |
| EP | 1925211 A1 | 5/2008 |
| EP | 1717318 B1 | 7/2008 |
| EP | 2717714 B1 | 1/2019 |
| EP | 3485739 A1 | 5/2019 |
| EP | 3485739 B1 | 7/2020 |
| FR | 2863873 A1 | 6/2005 |
| GB | 1050497 A | 12/1966 |
| IT | MI2014A1326 A1 | 8/2015 |
| JP | 3768236 B2 | 4/2006 |
| JP | 5640079 B2 | 12/2014 |
| KR | 20060123119 A | 12/2006 |
| KR | 20070117582 A | 12/2007 |
| KR | 20110058881 A | 6/2011 |
| MX | 2016013058 A | 2/2017 |
| RU | 2254773 C2 | 6/2005 |

(Continued)

OTHER PUBLICATIONS

International Search Report and Written Opinion for International Application No. PCT/IB2015/054782 filed Jun. 25, 2015 on behalf of SEVECOM S.P.A., dated Nov. 17, 2015. 10 pages.

(Continued)

*Primary Examiner* — Jenna A Watts
(74) *Attorney, Agent, or Firm* — Steinfl + Bruno LLP

(57) ABSTRACT

An emulsifier in powder form for animal feeds is described. A process for preparing the animal feed is also described.

18 Claims, No Drawings

(56) References Cited

FOREIGN PATENT DOCUMENTS

| | | | |
|---|---|---|---|
| WO | 95/28091 | A1 | 10/1995 |
| WO | 96/11585 | A1 | 4/1996 |
| WO | 97/28896 | A1 | 8/1997 |
| WO | 99/60865 | A1 | 12/1999 |
| WO | 01/70044 | A1 | 9/2001 |
| WO | 02/11550 | A2 | 2/2002 |
| WO | 03/092403 | A1 | 11/2003 |
| WO | 2005/034914 | A1 | 4/2005 |
| WO | 2006/024620 | A1 | 3/2006 |
| WO | 2006/094995 | A1 | 9/2006 |
| WO | 2008/000710 | A1 | 1/2008 |
| WO | 2010/029433 | A1 | 3/2010 |
| WO | 2010/133609 | A2 | 11/2010 |
| WO | 2012/080208 | A1 | 6/2012 |
| WO | 2012/168786 | A1 | 12/2012 |
| WO | 2012/168787 | A1 | 12/2012 |
| WO | 2012/169896 | A1 | 12/2012 |
| WO | 2013/003080 | A1 | 1/2013 |
| WO | 2014/087224 | A1 | 6/2014 |
| WO | 2015/155590 | A1 | 10/2015 |

OTHER PUBLICATIONS

2nd Brazilian Office Action for BR112013030431-6 filed for Serino Nazzaro on Nov. 6, 2012, dated Dec. 7, 2018. 13 pages. English + Brazilian translation.
Advisory Action for U.S. Appl. No. 14/909,455, filed Feb. 1, 2016 on behalf of SEVECOM S.P.A., dated May 10, 2019 8 pages.
Bontempo, V. et al. "The Effects of a Novel Synthetic Emulsifier Product on Growth Performance of Chickens for Fattening and Weaned Piglets", Animal, The Animal Consortium 2015, Accepted Oct. 7, 2015; 6 pages
Brazilian Office Action for Brazilian Application No. BR112016023135-0 filed on Apr. 8, 2015 on behalf of SEVECOM S.P.A., dated Oct. 21, 2019 5 pages (Partial English + Original).
Certificate of Correction for U.S. Pat. No. 5457128.
Chilean Office Action for Chilean Application No. 201602530 filed on Oct. 5, 2016 on behalf of SEVECOM S.P.A., dated Oct. 10, 2018 12 pages (Partial English + Original).
Chinese First Office Action for CN201280027254.1 which was filed in the name of SEVECOM S.P.A dated Dec. 31, 2014 (English Translation attached).
Chinese First Office Action for CN201280027314.X which was filed in the name of SEVECOM S.P.A., dated Jan. 21, 2015. (English Translation attached).
Chinese Search Report for CN201280027314.X which was filed in the name of SEVECOM S.P.A., dated Jan. 13, 2015. (English translation attached).
Chinese Second Office Action for CN80027254.1 which was filed in the name of SEVECOM S.P.A., dated Sep. 21, 2015. (Chinese Original + English Translation) 21 pages.
Dauqan, Eqbal M.A. et al., "Fatty Acids Composition of Four Different Vegetable Oils (Red Palm Olein, Palm Olein, Corn Oil and Coconut Oil) by Gas Chromatography", 2011 2nd International Conference on Chemistry and Chemical Engineering IPCBEE, vol. 14, (2011).
European Extended Search Report for Application No. 19150219.4, dated Feb. 21, 2019, by European Patent Office , 7 pages.
European Patent Office Communication pursuant to Article 94(3) EPC for European Patent Application No. 12740655.1 filed on behalf of SEVECOM S.P.A., dated Dec. 9, 2016. 6 pages.
Final Office Action for U.S. Appl. No. 14/125,084, filed Dec. 9, 2013 on behalf of SEVECOM S.P.A., dated Aug. 1, 2019 12 pages.
Final Office Action for U.S. Appl. No. 14/125,084, filed Dec. 9, 2013 on behalf of SEVECOM S.P.A dated Jun. 14, 2018. 10 pages.
Final Office Action for U.S. Appl. No. 14/125,084, filed Dec. 9, 2013 on behalf of SEVECOM S.P.A., dated Jun. 8, 2018 9 pages.
Final Office Action for U.S. Appl. No. 14/125,084, filed Dec. 9, 2013 on behalf of Serino Nazzaro, dated Sep. 2, 2015. 10 pages.
Final Office Action for U.S. Appl. No. 14/125,084, filed Dec. 9, 2013 on behalf of SEVECOM S.P.A., dated Dec. 15, 2016. 11 pages.
Final Office Action for U.S. Appl. No. 14/125,085, filed Dec. 9, 2013 on behalf of Serino Nazzaro, dated Jun. 23, 2017. 13 pages.
Final Office Action for U.S. Appl. No. 14/909,455, filed Feb. 1, 2016 on behalf of SEVECOM S.P.A., dated Jan. 3, 2019. 12 pages.
First Office Action for Eurasian Patent Application No. 201692571/28 filed on Jun. 25, 2015 on behalf of SEVECOM S.P.A., dated Sep. 13, 2019. (Russian & English Trans). 5 Pages.
Flanagan, J. et al., "Solubilisation of Soybean Oil in Microemulsions using Various Surfactants", Food Hydrocollids, vol. 20, No. 2-3, pp. 253-260, Abstract Only, (2006).
International Preliminary Report on Patentability for International Application No. PCT/IB2012/001134 filed Jun. 11, 2012 on behalf of SEVECOM S.P.A., dated Dec. 10, 2013, 5 pages.
International Preliminary Report on Patentability for PCT/IB2013/002702 filed Dec. 6, 2013 on behalf of SEVECOM S.P.A., dated Jun. 18, 2015. 5 pages.
International Preliminary Report on Patentability for PCT/IB2015/000452 filed Apr. 8, 2015 on behalf of SEVECOM S.P.A., dated Oct. 20, 2016. 7 pages.
International Preliminary Report on Patentability from International application PCT/IB2012/001128 filed Jun. 11, 2012 on behalf of SEVECOM S.P.A., dated Dec. 10, 2013. 6 pages.
International Search Report and Written Opinion for International Application No. PCT/IB2015/000452 filed Apr. 8, 2015 on behalf of SEVECOM S.P.A., dated Jul. 9, 2015, 10 pages.
International Search Report and Written Opinion for International Application No. PCT/IB2012/001134 filed Jun. 11, 2012 on behalf of SEVECOM S.P.A., dated Oct. 11, 2012, 10 pages.
International Search Report for International Application No. PCT/IB2012/001128 filed Jun. 11, 2012 on behalf of SEVECOM S.P.A., dated Oct. 8, 2012, 4 pages.
International Search Report for International Application No. PCT/IB2013/002702 filed Dec. 6, 2013 on behalf of SEVECOM S.P.A., dated Mar. 12, 2014. 5 pages.
Italian Search Report for MI20111051 filed on Jun. 10, 2011, dated Nov. 17, 2011. (English translation attached).
Italian Search Report for MI20120419 filed on Mar. 19, 2012, dated Dec. 18, 2012. (English translation attached).
Non-Final Office Action for U.S. Appl. No. 14/125,084, filed Dec. 9, 2013, on behalf of SEVECOM S.P.A., dated Jan. 7, 2019. 7 pages.
Non-Final Office Action for U.S. Appl. No. 14/909,455, filed Feb. 1, 2016 on behalf of SEVECOM S.P.A dated Aug. 29, 2019 15 pages.
Non-Final Office Action for U.S. Appl. No. 14/125,084, filed Dec. 9, 2013 on behalf of SEVECOM S.P.A., dated Jan. 7, 2017. 7 pages.
Non-Final Office Action for U.S. Appl. No. 14/125,084, filed Dec. 9, 2013 on behalf of SEVECOM S.P.A dated Sep. 29, 2017. 15 pages.
Non-Final Office Action for U.S. Appl. No. 14/125,085, filed Dec. 9, 2013 on behalf of Serino Nazzaro, dated Sep. 7, 2016. 14 pages.
Non-Final Office Action for U.S. Appl. No. 14/125,084, filed Dec. 9, 2013 on behalf of Serino Nazzaro, dated Mar. 29, 2016. 12 pages.
Non-Final Office Action for U.S. Appl. No. 14/125,084, filed Dec. 9, 2013 in the name of Serino Nazzaro, dated Mar. 26, 2015. 13 Pages.
Non-Final Office Action for U.S. Appl. No. 14/909,455, filed Feb. 1, 2016 on behalf of SEVECOM S.P.A., dated Apr. 30, 2018. 10 pages.
Notice of Allowance for U.S. Appl. No. 14/125,084, filed Dec. 9, 2013 on behalf of SEVECOM S.P.A., dated Jan. 21, 2020. 10 pages.
"Nourishing" Wiktionary, Dated Mar. 16, 2010, 1 page. https://web.archive.org/web/20100316183700/http://en.wiktionary.org:80/wiki/nourishing.
"Nourishment" Wiktionary, Dated Mar. 16, 2010, 1 page. https://web.archive.org/web/20130316103645/http://en.wiktionary.org:80/wiki/nourishment.
"Nutritive" Wiktionary, Dated Jun. 19, 2010, 1 page. https://web.archive.org/web/20100619020304/https://en.wiktionary.org/wiki/nutritive.

(56) References Cited

OTHER PUBLICATIONS

Olein—Definition of vegetable by Merriam-Webster https://www.merriam-webster.com/dictionary/olein. Downloaded May 26, 2015. 2 pgs.
Parr, W.H., The Small-Scale Manufacture of Compound Animal Feed (ODNRI Bulletin No. 9), pp. 20-38, (1998).
Preliminary Brazilian Office Action for Brazilian Application No. BR112017000878-5 filed on Jun. 25, 2015 on behalf of SEVECOM S.P.A., dated Oct. 31, 2019. (Partial English + Original). 5 pages.
Propylene-Glycol—Wikipedia Article Date: Apr. 30, 2019 10 pageshttps://en.wikipedia.org/w/index.php?title=Propylene_glycol&oldid=894359720.
Restriction Requirement for U.S. Appl. No. 14/125,085, filed Dec. 9, 2013 on behalf of Serino Nazzaro, dated Mar. 15, 2017. 9 pages.
Restriction Requirement for U.S. Appl. No. 14/649,523, filed Jun. 3, 2015 on behalf of Serino Nazzaro, dated Jul. 26, 2016. 7 pages.
Scientific Control—Wikipedia Article Date: Mar. 27, 2014 5 pages https://en.wikipedia.org/wiki/Scientific_control.
Vegetable—Definition of vegetable by Merriam-Webster https://www.merriam-webster.com/dictionary/vegetable. Downloaded May 26, 2015. 3 pgs.
"What is propylene glycol?", downloaded from https://www.atsdr.cdc.gov/csem, 8 pages, dated Dec. 2013 (Year: 2013).
Written Opinion for International Application No. PCT/IB2012/001128 filed Jun. 11, 2012 on behalf of SEVECOM S.P.A., dated Oct. 8, 2012, 5 pages.
Written Opinion for International Application No. PCT/IB2013/002702 filed Dec. 6, 2013 on behalf of SEVECOM S.P.A., dated Mar. 12, 2014. 4 pages.
European Patent Office Communication pursuant to Rule 71(3) EPC for European Patent Application No. 19150219.4 filed on Jun. 11, 2012 on behalf of SEVECOM S.P.A., dated Feb. 11, 2020. 31 pages.
Final Office Action for for U.S. Appl. No. 14/909,455, filed Feb. 1, 2016 on behalf of SEVECOM S.P.A dated Mar. 13, 2020. 23 Pages.
First Office Action for Malaysian Application No. PI 2017700035 flied on Jun. 25, 2015 on behalf of SEVECOM S.P.A., dated Mar. 27, 2020. 2 Pages.
Indonesian Office Action for Indonesian Patent Application No. P00201701123 filed on behalf of SEVECOM S.P.A., dated Feb. 24, 2020. 3 Pages (Indonesian + English Trans).
Notice of Allowance for Korean Application No. 20147000619 filed on Jan. 9, 2014 in the name of SEVECOM S.P.A., dated Jan. 23, 2020. 4 Pages (Korean & English Trans).
First Examination Report for Chilean Patent Application 201700091 filed on behalf of SEVECOM S.P.A., dated May 14, 2018. 14 pages. (Spanish Original + English Translation.
Juan Elias Castillo Hidlago, "Rheological Characterization and Determination of Optimum Time of Mixing (T.O.M.) in Mixes of Powders for Veterinary Use", Austral University of Chile, Valdivia-Chile, (2011), 77 pages. (English Translation + Spanish Original).
Office Action and Search Report for Chinese Patent Application No. 201711120723.5 with English Translation. dated Jul. 2, 2020. 14 pages.
Notice of Allowance for U.S. Appl. No. 14/125,084. dated Jun. 17, 2020. 5 pages.
Notice of Allowance for U.S. Appl. No. 14/125,084, filed Dec. 9, 2013 on behalf of SEVECOM S.P.A. dated Sep. 1, 2020. 7 pages.
Russian Office Action for RU201991905/28. dated Aug. 31, 2020. Original +Eng Trans. 4 pages.
Indian office Action for IN Application No. 201627044599 filed Dec. 28, 2016 behalf of SEVECOM S.P.A. dated Oct. 1, 2020. 5 Pages Hindi + English Translation.
Mexican Office Action for MX Application No. MX/a/2017/000849 filed Jun. 25, 2015 on behalf of SEVECOM S.P.A. dated Sep. 7, 2020. 9 Pages.Spanish + English Translation.
Notice of Allowability for Ukrainian Patent Application No. 201700730 filed Jun. 25, 2015, of SEVECOM S.p.A. dated Sep. 16, 2020. Ukrainian Original + English Translation. 6 Pages.

Office Action for Chinese Patent Application No. 201580038274.2 filed Jun. 25, 2015 on behalf of Sevecom S.P.A. dated Sep. 29, 2020. CN Original + English Trans. 13 pages.
Office Action for Indonesian Patent Application No. P0020170112 filed on behalf of SEVECOM S.p.A. dated Oct. 22, 2020. Indonesian + English translation. 4 Pages.
Office Action for Vietnamese application 1-2014-00015 filed Jun. 11, 2012 on behalf of Sevecom S.P.A. dated Sep. 30, 2020. Original and Eng trans. 3pages.
Physical Chemistry, Beijing Medical College, p. 83, People's Medical Publishing House, Jul. 1979. 4 Pages. Chinese Original and Partial English.
Ping, Ning et al., "New Technology Practice Manual of Novel Process and Application of Feed Additive Development and processing," vol. 1, p. 27, Minerals, Tsinghua Tongfang (CD) Electronic Publishing House, Mar. 2004. 3 Pages. Chinese Original and Partial English Trans.
Notice of Allowance for U.S. Appl. No. 14/125,084, filed Dec. 9, 2013 on behalf of Sevecom S.P.A. dated Mar. 22, 2021. 12 pages.
Form M. 0203ES, dated Oct. 23, 2009, Institute of Ethical and Environmental Certification, pp. 1-2, 49 and 50. rosorganic.ru/files/stardart-icea.pdf. 5 pages, Original + Partial Eng trans.
Invitation pursuant to Rule137(4) EPC and Article 94(3) EPC from the European Patent Office for EP Application 15753449.6 filed Jun. 25, 2015 for Sevecom S.P.A. dated Dec. 1, 2020. 2 pages.
Notification of the necessity to present additional materials for Eurasian Patent Application No. 201692571/28 filed Jun. 25, 2015 on behalf of Sevecom S.P.A. dated Oct. 21, 2020. (Russian & English Trans) 10 pages.
Office Action issued by the Intellectual Property Office of Vietnam for Vietnamese Application No. 1-2017-00080 filed Jun. 25, 2015 for Sevecom S.P.A. dated Oct. 30, 2020. 4 pages. Original + Eng trans.
Technical Report No. VLT0043-2020 for Peruvian Case file No. 000025-2017/DIN filed Jan. 6, 2017 (corresponding PCT/IB2015/054782) on behalf of Sevecom S.P.A. Issued by INDECOPI dated Nov. 30, 2020.Spanish Original + Eng trans.11 pages.
Korean Patent Office Notice of Allowance from for Korean Application No. 10-2020-7009778 in the name of Sevecom S.P.A. dated Nov. 26, 2020. Original + Eng translation. 3 pages.
Chinese Feed Ingredients Purchasing Guide, Second Edition, Feed Research Institute of Chinese Academy of Agriculture Sciences, pp. 335, 338 and 339, China Agricultural University Press, Nov. 2007. CN Original + Partial English Translation. 7 pages.
Decision of Rejection for CN Patent Application No. 201580038274.2 filed Jun. 25, 2015, on behalf of Sevecom S.P.A. dated Mar. 2, 2021. CN Original + English Translation. 12 pages.
Grant Notification Issued for Indonesian Patent Application No. P00201701123 filed Jun. 25, 2015 on behalf of Sevecom S.P.A. dated Mar. 2, 2021. 4 Pages. Indonesian Original + English Translation.
Mexican Second Office Action for MX Application No. MX/a/2017/000849 filed Jun. 25, 2015 on behalf of Sevecom S.P.A.dated Mar. 2, 2021. 6 Pages. Spanish Original + Partial English Trans Iation.
Non-Final Office Action for U.S. Appl. No. 16/945,045, filed Jul. 31, 2020 on behalf of Sevecom S.P.A. dated Jul. 6, 2021. 9 pages.
Subsequent Substantive Examination Report for Filipino Application No. Jan. 2017/500004 filed Jan. 3, 2017, on behalf of Sevecom S.P.A. dated Apr. 22, 2021. 4 pages.
Substantive Examination Report for Filipino Application No. 1/2017/500004 filed Jan. 3, 2017, on behalf of Sevecom S.P.A. dated Jun. 23, 2020. 5 Pages.
Eurasian Office Action for Eurasian Application No. 201692571 filed Jun. 25, 2015 on behalf of Sevecom S.P.A. dated Jul. 19, 2021. 6 pages (English + Original).
Mexican Grant Notification for MX Application No. MX/a/2017/000849 filed Jun. 25, 2015 on behalf of Sevecom S.P.A. dated Jun. 29, 2021. 3 pages. Spanish Original + Machine Translation.
Notice of Allowance for U.S. Appl. No. 14/125,084, filed Dec. 9, 2013, on behalf of Sevecom S.P.A. dated Aug. 26, 2021. 8 Pages.
Communication pursuant to Article 94(3) EPC from the European Patent Office for EP Application 15753449.6 filed Jun. 25, 2015 for Sevecom S.P.A. dated Sep. 30, 2021. 3 pages.

(56) References Cited

OTHER PUBLICATIONS

Russian Office Action for RU Application No. 2019091905/28 filed Oct. 30, 2019 on behalf of Sevecom SPA. dated Sep. 3, 2021. 3 Pages. English and Russian.

* cited by examiner

POWDERED EMULSION FOR ANIMAL FEED

CROSS-REFERENCE TO RELATED APPLICATIONS

The present application is the U.S. national stage of International Patent Application PCT/IB2015/054782 filed on Jun. 25, 2015 which, in turn, claims priority to Italian application MI2014A001326 filed on Jul. 21, 2014.

The present invention relates to an emulsifier in powder form for animal feeds. The present invention further relates to a process for preparing said animal feed.

It is known about the presence on the market of liquid emulsifiers used in the production of animal feeds. However, liquid emulsifiers have some limitations that do not always allow them to be used easily and satisfactorily.

In general, a liquid emulsifier can have such a solidification point that at given outer temperature, e.g. below 15° C., the emulsifier becomes solid and/or hardly usable in feed plants provided with multiple complex pipes and distribution and dosing valves. At such outer temperatures the emulsifier must be kept within heated tanks and/or supplied to the feed plants by means of heated pipes so as to prevent the emulsifier from freezing.

It can therefore be inferred that in some countries with cold climates or with particularly frigid winters during which the outer temperature is below 15° C. (pressure 1 atm), some emulsifiers cannot be easily used.

Moreover, the storage of an emulsifier in liquid form and the use/dosage thereof in plants have some limitations.

Field experts therefore need to have an emulsifier for animal feeds which can adequately respond to the limitations and drawbacks of emulsifiers as described above.

It would be desirable to have an emulsifier for animal feeds which, beyond being without the limitations and drawbacks described above, can also be easily handled and used in existing plants for the production of animal feeds in solid form, such as e.g. in pellet form, and which is also performing as far as the following aspects are concerned:
  (i) amount of feed produced: in terms of increase of hourly output (ton of feed produced/hour) or, hourly output being the same, reduction of energy consumption (ampere/hour);
  (ii) physical-chemical characteristics of feed produced: in terms of increase of pellet durability index (PDI), temperature and moisture of pellet produced and reduction of the amount of powder generated (average powder diameter and % produced);
  (iii) efficiency of feed manufacturing plant: in terms of reduction of height wear of dies present in pelleting plants and reduction of the number of downtimes for maintenance which the plant must deal with.

After an intensive research and development activity, the Applicant has responded to the above mentioned needs by developing an emulsifier in powder form.

An object of the present invention is a solid composition in powder form having the characteristics as defined in the appended claim.

An object of the present invention is a process for preparing said solid composition in powder form having the characteristics as defined in the appended claim.

An object of the present invention is the use of said solid composition in powder form for preparing an animal feed having the characteristics as defined in the appended claim.

An object of the present invention is an animal feed comprising said solid composition in powder form having the characteristics as defined in the appended claim.

An object of the present invention is a solid mixture comprising said solid composition in powder form having the characteristics as defined in the appended claim.

An object of the present invention is a process for preparing said solid mixture in powder form having the characteristics as defined in the appended claim.

An object of the present invention is the use of said solid mixture in powder form for preparing an animal feed having the characteristics as defined in the appended claim.

An object of the present invention is an animal feed comprising said solid mixture in powder form having the characteristics as defined in the appended claim.

Preferred embodiments of the present invention will be provided below in the following detailed description.

The solid composition of the present invention is a solid composition in powder form. Said solid composition comprises a carrier or support in powder form. On the carrier or support was incorporated or adsorbed or absorbed or applied on the outer surface, by means of the techniques, processes and equipment known to skilled technicians, at least one emulsifier (i)-(vii) chosen from the group comprising or alternatively consisting of:
  (i) a mixture comprising or alternatively consisting of an ethoxylated castor oil and at least one vegetable olein;
  (ii) a mixture comprising or alternatively consisting of an ethoxylated castor oil, at least one vegetable olein and a propylene glycol;
  (iii) a mixture comprising or alternatively consisting of polyethylene glycol esters of fatty acid from soya oil;
  (iv) a mixture comprising or alternatively consisting of polyethylene glycol esters of fatty acid from soya oil, and at least one vegetable olein;
  (v) a mixture comprising or alternatively consisting of polyethylene glycol esters of fatty acid from soya oil, at least one vegetable olein and a propylene glycol;
  (vi) a mixture comprising or alternatively consisting of a mixture comprising or alternatively consisting of an ethoxylated castor oil and polyethylene glycol esters of fatty acid from soya oil; or
  (vii) a mixture (i)-(vi).

The carrier or support is in powder form and is present in said solid composition in an amount by weight from 20% to 50%, with respect to the weight of the solid composition, preferably in an amount by weight from 30% to 40%, with respect to the weight of the solid composition; whereas said at least one emulsifier which is incorporated or adsorbed or absorbed or applied on the outer surface is chosen from the group comprising or alternatively consisting of the emulsifiers (i)-(vii) and is present in said solid composition in an amount by weight from 80% to 50%, with respect to the weight of the solid composition, preferably in an amount by weight from 70% to 60%, with respect to the weight of the solid composition.

The carrier or support is chosen from the group comprising or alternatively consisting of (a) inorganic substrates or (b) vegetable substrates. Preferably, said (a) inorganic substrate is chosen from the group comprising or alternatively consisting of:
  (a1) silica; preferably the silica is a colloidal silica and is preferably chosen from the group comprising E551a and/or E551b;
  (a2) bentonites;
  (a3) zeolites;
  (a4) sepiolite, preferably the sepiolite is a sepiolite E562;
  (a5) perlite, preferably the perlite is a perlite E599.

Preferably, said (a) inorganic substrates have an average granulometric distribution from 50 to 250 microns, preferably from 100 to 200 microns, for at least 95% of substrate.

As an alternative, the carrier or support is chosen from the groups comprising or alternatively consisting of (b) vegetable substrates.

Preferably, said (b) vegetable substrates are chosen from the group comprising or alternatively consisting of:
(b1) corn cob or corn fiber;
(b2) broad bean fiber;
(b3) pea fiber, wood fiber or grape seed.

Preferably, said (b) vegetable substrates have an average granulometric distribution from 50 to 250 microns, preferably from 100 to 200 microns, for at least 95% of substrate.

In one embodiment, the solid composition of the present invention in powder form comprises a carrier or support in powder form, as described above, on which was incorporated or adsorbed or absorbed or applied on the surface, by means of the techniques, processes, equipment and under the operating conditions known to skilled technicians, at least one emulsifier (i), as described above, comprising or alternatively consisting of a mixture comprising or alternatively consisting of an ethoxylated castor oil and at least one vegetable olein.

Ethoxylated castor oil, also known as glyceryl polyethylene glycol ricinoleate or glycerol polyethylene glycol ricinoleate (additive E484—EU Reg. 1831/2003), is a surfactant compound or an emulsifier admitted in the list of additives for animal nutrition.

The ethoxylated castor oil contained in said emulsifier (i) or emulsifier (ii) can contain from 8 to 80 ethylene oxy groups; preferably from 10 to 50 ethylene oxy groups; still more preferably from 20 to 40 ethylene oxy groups. The listed values are to be regarded as average ethoxylation values.

Ethoxylated castor oil containing e.g. 20 ethylene oxy groups (an ethylene oxy group derives from the ethoxylation of castor oil with ethylene oxide) means a product obtained by reacting 1 mole of castor oil (generally, a castor oil can contain e.g. ricinoleic acid in an amount by weight from 85% to 95%, oleic acid in an amount by weight from 2% to 6%, linoleic acid in an amount by weight from 5 to 1%, linolenic acid in an amount by weight from 1 to 0.5%, stearic acid in an amount by weight from 1 to 0.5%, palmitic acid in an amount by weight from 1 to 0.5%, dihydroxystearic acid in an amount by weight from 1 to 0.5%, and other compounds in an amount by weight from 0.5% to 0.2%] with 20 moles of ethylene oxide according to the techniques, processes, equipment and under the operating conditions known to skilled technicians.

In the framework of the present invention and in the continuation thereof, reference will be made in general to "ethoxylated castor oil" to refer to one or more ethoxylated castor oils, contained in the emulsifiers (i) or (ii) or (vi), having a variable number of ethylene oxy groups, without limitations but to the sole purpose of simplifying the present description.

Therefore, the emulsifier (i) comprises or alternatively consists of a mixture comprising or alternatively consisting of "an ethoxylated castor oil" and at least one vegetable olein. In one embodiment, said ethoxylated castor oil is represented by additive E484—EU Reg. 1831/2003.

Conversely, the emulsifier (ii) comprises or alternatively consists of a mixture comprising or alternatively consisting of "an ethoxylated castor oil", at least one vegetable olein and a propylene glycol.

Polyethylene glycol esters of fatty acids from soya oil, contained in the emulsifiers (iii) or (iv) or (v) or (vi), are surfactant compounds or emulsifiers admitted in the list of additives for animal nutrition. Polyethylene glycol esters of fatty acids from soya oil can be represented by additive E487—EU Reg. 1831/2003.

Said polyethylene glycol esters of fatty acids from soya oil (additive E487—EU Reg. 1831/2003) are obtained according to the techniques, processes, equipment and under the operating conditions known to skilled technicians.

For instance, polyethylene glycol esters of fatty acids from soya oil (additive E487—EU Reg. 1831/2003) can be obtained starting from soya oil, e.g. from hydrolyzed soya oil triglycerides, according to the techniques, processes, equipment and under the operating conditions known to skilled technicians, to obtain soya oil saturated and/or unsaturated fatty acids. Said fatty acids are then ethoxylated with ethylene oxide, according to the techniques, processes, equipment and under the operating conditions known to skilled technicians. Ethylene oxide binds to the carboxyl of the fatty acid so as to obtain the fatty acid from ethoxylated soya oil.

For instance, said polyethylene glycol esters of fatty acids from soya oil (additive E487—EU Reg. 1831/2003) can be obtained from the reaction between a polyethylene glycol—for shortness referred to as PEG [CAS No. 25322-68-3; structure formula $HOCH_2—(CH_2—O—CH_2)_{(n-1)}—CH_2OH$ or $H—(OCH_2—CH_2)_n—OH$; molecular weight e.g. from 100 to 10000] with the fatty acids obtained from soya oil or with the soya oil fats or triglycerides according to the techniques, processes, equipment and under the operating conditions known to skilled technicians.

Fatty acids obtained from soya oil mean one or more fatty acids obtained (e.g. by hydrolysis) according to the techniques, processes, equipment and under the operating conditions known to skilled technicians.

Polyethylene glycol (PEG) can have a molecular weight from 200 to 5000; preferably, polyethylene glycol has a molecular weight from 300 to 4000; still more preferably from 400 to 3500.

In one embodiment, polyethylene glycol has a molecular weight from 500 to 1500. In one embodiment, polyethylene glycol has a molecular weight from 600 to 1000, e.g. from 700 to 900.

Soya oil (100 g) generally has the following composition: about 16 g of saturated fats, about 23 g of monounsaturated fats, about 58 g of polyunsaturated fats and about 3% of other compounds.

From a soya oil, preferably a refined soya oil, the following fatty acids can be generally obtained:
alpha-linolenic acid (C-18:3)—CAS number 463-40-1, about 5 to 10%;
linoleic acid (C-18:2)—CAS number 60-33-3, about 50 to 60%;
oleic acid (C-18:1)—CAS number 112-80-1, about 18 to 25%;
stearic acid—CAS number 57-11-4, about 3 to 6%;
palmitic acid—CAS number 57-10-3, about 8 to 12%.

The polyethylene glycol esters of fatty acids from soya oil of the present invention (additive E487—EU Reg. No. 1831/2003) can be for instance in the form of monoesters or diesters or mixtures thereof.

For instance, polyethylene glycol PEG was reacted with a fatty acid from soya oil in a molar ratio 1:1, or with a mixture of fatty acids from soya oil in a molar ratio 1:1, so as to obtain monoesters.

For instance, polyethylene glycol PEG was reacted with a fatty acid from soya oil in a molar ratio 1:2, or with a mixture of fatty acids from soya oil in a molar ratio 1:2, so as to obtain diesters.

As an alternative, the polyethylene glycol esters of fatty acids from soya oil in the framework of the present invention can be obtained by subjecting the fatty acids of soya oil and/or the fats or triglycerides of soya oil to an ethoxylation process with ethylene oxide according to the techniques, processes, equipment and under the operating conditions known to skilled technicians. For instance, the fatty acids of soya oil having a CAS No. 068308-53-2, code EINECS 269-657-0 and the following composition (analysis process DGF-C-VI 11e: C16, 9-12%; C16:1, 0-1%; C18, 2-6%; C18:1, 20-29%; C18:2, 47-58%, 018:3, 4-10%; others 0-1%; below or equal to C14, 0-1%; above or equal to C20, 0-2%) can be ethoxylated so as to obtain a final average ethoxylation degree of 20 moles or 40 moles.

In the framework of the present invention and in the continuation thereof, reference will be made in general to "polyethylene glycol esters of fatty acids from soya oil" to refer to one or more of said esters, contained in the emulsifiers (iii) or (iv) or (v) or (vi) having a components polyethylene glycol PEG with a variable molecular weight and a components of fatty acids of soya oil, both of which are variable, without limitations but to the sole purpose of simplifying the present description.

Therefore, the emulsifier (iii) comprises or alternatively consists of "polyethylene glycol esters of fatty acids from soya oil". In one embodiment, said polyethylene glycol esters of fatty acids from soya oil are represented by additive E487—EU Reg. 1831/2003.

Moreover, the emulsifier (iv) comprises or alternatively consists of a mixture comprising or alternatively consisting of "polyethylene glycol esters of fatty acids from soya oil" and at least one vegetable olein. In one embodiment, said polyethylene glycol esters of fatty acids from soya oil are represented by additive E487—EU Reg. 1831/2003, whereas oleins are described below.

Finally, the emulsifier (v) comprises or alternatively consists of a mixture comprising or alternatively consisting of "polyethylene glycol esters of fatty acids from soya oil", at least one vegetable olein and a propylene glycol. In one embodiment, said polyethylene glycol esters of fatty acids from soya oil are represented by additive E487—EU Reg. 1831/2003, whereas oleins are described below.

As an alternative, the emulsifier (vi) comprises or alternatively consists of a mixture comprising or alternatively consisting of "an ethoxylated castor oil" and "polyethylene glycol esters of fatty acids from soya oil". In one embodiment, said ethoxylated castor oil is represented by additive E484—EU Reg. 1831/2003 and said polyethylene glycol esters of fatty acids from soya oil are represented by additive E487—EU Reg. 1831/2003.

The polyethylene glycol component contained in said "polyethylene glycol esters of fatty acids from soya oil" has a molecular weight from 100 to 1000 and the fatty acid component contained in soya oil fatty acid is alpha-linolenic acid (C-18:3)—CAS number 463-40-1, or linoleic acid (C-18:2)—CAS number 60-33-3, or oleic acid (C-18:1)—CAS number 112-80-1, or stearic acid—CAS number 57-11-4, or palmitic acid—CAS number 57-10-3 or mixtures thereof; in particular the soya oil fatty acid can be chosen from a mixture of alpha-linolenic acid and/or linoleic acid and/or oleic acid in a weight ratio of 1:1:1 or 1:1:2 or 1:2:1 or 1:2:2.

The vegetable olein or oleins, contained in the emulsifiers (i), (ii), (iv) and (v) forming an object of the present invention, are chosen from the group comprising or alternatively consisting of oleic acid, linoleic acid, linolenic acid, a triglyceride of oleic acid $[(C_{17}H_{33}COO)_3C_3H_5]$ (also known as triolein), a vegetable oil or mixtures thereof.

Said vegetable oil can be chosen from the group comprising or alternatively consisting of olive oil, linseed oil, rapeseed oil, peanut oil, corn oil, palm oil, sunflower oil and/or soya oil. The emulsifiers (i), (ii), (iv) and (v) can comprise or alternatively consist of an olive oil and/or a palm oil.

Said at least one vegetable olein or vegetable oleins, contained in the emulsifiers (i), (ii), (iv) and (v), forming an object of the present invention, comprise (amount by weight with respect to the total weight of the vegetable olein) or alternatively consist of an oleic acid (C18:1) in an amount from 70 to 99% by weight, with respect to the total weight of the vegetable olein, and/or a linoleic acid (C18:2) in an amount from 30 to 1% by weight, with respect to the total weight of the vegetable olein.

Said at least one vegetable olein or vegetable oleins, contained in the emulsifiers (i), (ii), (iv) and (v), forming an object of the present invention, comprise (amount by weight with respect to the total weight of the vegetable olein) or alternatively consist of an oleic acid (C18:1) in an amount from 75 to 90% by weight, with respect to the total weight of the vegetable olein; preferably from 80 to 85% by weight, with respect to the total weight of the vegetable olein, and/or a linoleic acid (C18:2) in an amount from 25 to 10% by weight, with respect to the total weight of the vegetable olein; preferably an oleic acid in an amount from 80 to 85% by weight, with respect to the total weight of the vegetable olein; and/or a linoleic acid in an amount from 20 to 15% by weight, with respect to the total weight of the vegetable olein.

Said at least one vegetable olein or vegetable oleins, contained in the emulsifiers (i), (ii), (iv) and (v), forming an object of the present invention, as described above, can further comprise some saturated fatty acids with a number of carbon atoms of 18 or below, in an amount below 15% by weight, preferably in an amount from 5 to 10% weight.

In one embodiment, the vegetable olein or vegetable oleins, contained in the emulsifiers (i), (ii), (iv) and (v), forming an object of the present invention, is an olein having the following parameters: EINECS 266-932-7, CAS No. 67701-08-0 and having a chain distribution (%) [process ISO 5508] of: C14 or below, 0-4; C16 2-6; C18 0-3; C18' (oleic acid) above 75; C18" (linoleic acid) 8-13; above C18 0-2.

Said at least one vegetable olein or vegetable oleins, contained in the emulsifiers (i), (ii), (iv) and (v), forming an object of the present invention, comprise or alternatively consist of a vegetable oil.

The vegetable oil can be chosen from the group comprising or alternatively consisting of olive oil, linseed oil, rapeseed oil, peanut oil, corn oil, palm oil, sunflower oil and/or soya oil. The emulsifier of the present invention can comprise or alternatively consist of an olive oil and/or a palm oil.

In one embodiment, said at least one vegetable olein or vegetable oleins, contained in the emulsifiers (i), (ii), (iv) and (v), forming an object of the present invention, comprise or alternatively consist of a vegetable oil and an oleic oil in a weight ratio from 1:3 to 3:1, preferably from 1:2 to 2:1, still more preferably in a weight ratio of 1:1. Preferably, the oleic acid is chosen among products having a concentration of oleic acid above 70% by weight, preferably above 90% by weight.

Palm olein can have a composition such as: C12:0=2-3%, C14:0=0.5-1%, C16:0=4-5%, C18:0=2-3%, C18:1=70-80%, C18:2=10-15%, other substances about 1%.

Sunflower oil can have a composition such as: C16:0=5-15%, C18:0=2-8%, C18:1=20-35%, 018:2=45-70%, C18:3=0-7%.

In one embodiment, another vegetable olein can have the following compositions: acids with a number of carbon atoms of or below C14=2-3%, C16:0=4-5%, C18:0=1-2%, C18:1=75-80%, C18:2=10-11%.

In one embodiment, another vegetable olein can have the following composition: C18:0 below 15%, C18:1 above 75%, C18:2 below 15%, other substances below 1%.

The determination of the composition of the fatty acids by means of gas chromatographic analysis can be carried out with the process NGD C 42-76. Conversely, the determination of the triglycerides in the vegetable oils by means of high performance liquid chromatography (HPLC) can be carried out with the process NGD C 45-91:22024 (1992).

In the framework of the present invention and in the continuation thereof, reference will be made in general to "olein or oleins" to refer to one or more of the above mentioned vegetable oleins contained in the emulsifiers (i), (ii), (iv) and (v), forming an object of the present invention, without limitations but to the sole purpose of simplifying the present description.

The glycols contained in the mixture forming an object of the present invention are chosen among non-toxic glycols which are acceptable for animal nutrition. The glycols are present in the emulsifiers (ii) and (v), forming an object of the present invention, in an amount from 2% to 25% by weight, preferably from 5% to 20% by weight; still more preferably from 10% to 15% by weight, with respect to the total weight of the mixture; advantageously 10% by weight.

Advantageously, the presence of glycols in the emulsifiers (ii) and (v), forming an object of the present invention, lowers the freezing point thereof keeping them in liquid state and therefore enabling the use of the mixture even at temperatures below 0° C. (zero), preferably at temperatures from 0° C. to minus 20° C. (−20° C.).

An object of the present invention is a process for preparing said solid composition in powder form, wherein said process includes a step in which one of the emulsifiers (i)-(vii), in liquid state, is incorporated or adsorbed or absorbed or applied on the outer surface of a carrier or support (a) and/or (b), as described above, by spraying or mechanical or air mixing of said emulsifier in liquid state, preferably at a temperature from 25 to 45° C. It is essential that at the end of the process the solid composition in powder form remains free flowing at a room temperature of 25° C. (pressure 1 Atm), so as to avoid packing phenomena and enable a homogenous distribution thereof in the main component of the solid mixture described below.

An object of the present invention is an animal feed comprising said solid composition in powder form, preferably in an amount by weight from 5 to 50%. In practice, said solid composition in powder form can be mechanically mixed with the components of a basic feed formulation such as e.g. a corn-based formulation for poultry (% by weight): corn 45%, soya 21%, wheat 15%, fats/oils (soya oil, palm oil, sunflower oil, poultry fat) 8%, soya seed 10%, supplements (vitamins and minerals) 1%.

An object of the present invention is a solid mixture comprising said solid composition in powder form and a mineral inert, said mineral inert being chosen from the group comprising or alternatively consisting of calcium oxide, magnesium-calcium oxide, magnesium oxide.

In one embodiment, the mineral inert is represented by a mixture comprising magnesium oxide with a content by weight of at least 95%, silicon oxide with a content by weight below 1%, calcium oxide with a content by weight below 2.5% and iron (III) oxide and aluminum oxide each below 0.04%. Said mixture has the commercial name of LuvoMag MO W-92 (Lehmann & Voss & Co.) and has the following characteristics: Mg % min. 55.5; MgO % min. 92; $SiO_2$% max. 3; CaO % max. 2.5; $Al_2O_3$% max. 0.5; $Fe_2O_3$% max. 0.2. The average granulometry is below 70 μm/200 mesh, at a min. % of 95%.

The solid mixture of the present invention comprises said solid composition in powder form in an amount by weight from 5% to 30%, preferably of 10%, and said mineral inert material in an amount from 95% to 70%, preferably of 90%.

The solid mixture forming an object of the present invention is prepared by mechanically mixing said solid composition in powder form with said mineral inert so as to obtain a homogeneous mixture which keeps its free flowing characteristics. In practice, the solid composition in powder form can be homogeneously and uniformly distributed on the outer surface of the granules of said mineral inert by modifying the degree of lipophilia and hydrophilia of the mineral inert and therefore also of the final solid mixture. The solid composition of the present invention and the mixture thus prepared behave like a colloid. The solid mixture can be distributed on the components and ingredients constituting the animal feed in solid form as pellets. These physical-chemical characteristics of the solid mixture of the present invention enable to increase pellet production in an animal feed plant, decrease the content of powders produced (by-product to be avoided for reasons involving yield and operators' health), spare required energy at the same level of production, and stabilize the water of content of about 12% by weight.

An object of the present invention is an animal feed in solid form containing liquid and/or solid nutritive substances, the solid ones as powders or granules or pellets or cubes, which comprises said solid mixture, as described above.

The Applicant has found that the use of the solid mixture forming an object of the present invention for preparing an animal feed in pellet form is highly performing (see Tables 1 and 2) as far as the following aspects are concerned:
  (i) amount of feed produced: in terms of increase of hourly output (ton of feed produced/hour) or, hourly output being the same, reduction of energy consumption (ampere/hour);
  (ii) physical-chemical characteristics of feed produced: in terms of increase of pellet durability index (PDI), temperature and moisture of pellet produced and reduction of the amount of powder generated (average powder diameter and % produced);
  (iii) efficiency of feed manufacturing plant: in terms of reduction of height wear of dies present in pelleting plants and reduction of the number of downtimes for maintenance which the plant must deal with.

The animal feed of the present invention is preferably a dry feed in the form of cubes or pellets or granules or powders, which comprises said solid mixture.

In the framework of the present invention, animal feed means by way of non-limiting example a feed for pigs, fish, poultry such as chickens and turkeys, and ruminants, e.g. cows and calves at any stage of growth.

The present invention also relates to a process for preparing said feed.

An object of the present invention is a process for preparing an animal feed in solid form, wherein said process comprises at least a step in which the solid mixture, forming an object of the present inventions, is added to the liquid and/or solid (in powder or granular form) nutritive substances or optionally to other liquid or solid components of the animal feed.

In a preferred embodiment, the animal feed can further contain a hydrophobic component of animal or vegetable origin in liquid or solid form at room temperature (T 20° C. and pressure 1 atmosphere), said hydrophobic component being chosen from the group comprising animal and/or vegetable lipids, animal and/or vegetable oils, animal and/or vegetable fats; preferably it is an animal fat.

In a first case, said hydrophobic component is first added with the solid mixture of the present invention and then with the liquid or powder or granular nutritive substances or with other solid components of the animal feed or with a mixture of two or more of these components.

In a second case, said hydrophobic component is first added with the liquid or powder or granular nutritive substances or with other solid components of the animal feed or with a mixture of two or more of these components and then with the solid mixture of the present invention.

In another embodiment, the solid mixture of the present invention can be added directly to a liquid or solid hydrophobic component at room temperature such as e.g. an animal and/or vegetable lipid, an oil, preferably a vegetable oil, a liquid and/or solid fat, preferably an animal fat, and then to the liquid or powder or granular nutritive substances or with the other solid components of the animal feed.

If the solid mixture of the present invention is used, the industrial preparation of an animal feed includes the preparation of a pre-mixture containing macro-elements such as e.g. soya, corn, animal or vegetable flours, and micro-elements such as e.g. mineral salts, vitamins, flavors and other substances commonly used by skilled technicians. Depending on the type of feed other components can also be added to the pre-mixture, such as cereals, barley, rye and rice, vegetable proteins e.g. proteins from soya, from sunflower, from corn or other proteins commonly used by skilled technicians. The pre-mixture is then added with the solid mixture of the present invention comprising the emulsifiers (i)-(vii).

The animal feed forming an object of the present invention can comprise said solid mixture in an amount from 0.5 kg to 1.5 kg/ton of feed.

The animal feed of the present invention can be subjected to a pelleting or extrusion step so as to obtain a feed with variable size that is typical of pellet or granular feeds for animals.

The present invention will now be described by means of some experimental tests whose results are shown in Tables 1 and 2 as a merely illustrative and therefore non-limiting purpose of the scope of the present invention.

TABLE 1

| | TURKEYS-CORN BASIS NORMAL | | TURKEYS-CORN BASIS WITH solid mixture of the invention | |
|---|---|---|---|---|
| | PRODUCTION | | 1st test | 2nd test |
| | 1st control | 2st control | 0.5 kg/ton | 1.5 Kg/ton |
| T ° C. | 74 | 78 | 85 | 87 |
| AMP. | 350* | 350* | 380 | 400 |
| T/h | 13.0 | 14.00 | 20 | 22 |
| UM.C. | 1500 | 15.00 | 16.00 | 16.30 |

TABLE 1-continued

| | TURKEYS-CORN BASIS NORMAL | | TURKEYS-CORN BASIS WITH solid mixture of the invention | |
|---|---|---|---|---|
| | PRODUCTION | | 1st test | 2nd test |
| | 1st control | 2st control | 0.5 kg/ton | 1.5 Kg/ton |
| UM.F. | 11.30 | 11.60 | 12.50 | 12.70 |
| PDI | 93 | 92 | 98 | 98 |
| | Die 80 × 3.5 mm | Die 65 × 3.5 mm | Die 65 × 3.5 mm | Die 50 × 3.5 mm |

*increasing production the machine gets stuck
UM.F. Pellet moisture
Notes:
The solid mixture of the present invention allows to strongly reduce die thickness, thus highly increasing output and the amount of pellet produced

TABLE 2

| | PIGS-FATTENING ON CORN BASIS | | PIGS-FATTENING WITH solid mixture of the invention | |
|---|---|---|---|---|
| | | | 1st test | 2nd test |
| | 1st control | 2nd control | 0.5 kg/ton | 1.50 kg/ton |
| T ° C. | 72 | 75 | 78-80 | 85 |
| AMP. | 330* | 320* | 360 | 400 |
| T/h | 12 | 12 | 16 | 20 |
| U.F. | 11.20 | 11.30 | 12.03 | 12.70 |
| PDI | 88 | 85 | 95 | 98 |
| | Die 80 × 3.5 mm | Die 65 × 3.5 mm | Die 70 × 3.5 mm | Die 40 × 3.5 mm |

Notes
The solid mixture of the present invention allows to strongly reduce die thickness, thus highly increasing output and the amount of pellet produced

The invention claimed is:

1. A solid mixture comprising:
   a solid composition in powder form comprising:
      a carrier or support in powder form,
         with at least one emulsifier incorporated, or adsorbed, or absorbed, or applied on an outer face of the carrier or support in powder form, the at least one emulsifier chosen from the group consisting of:
            (i) a mixture comprising an ethoxylated castor oil and at least one vegetable olein;
            (ii) a mixture comprising an ethoxylated castor oil, at least one vegetable olein and a propylene glycol;
            (iii) a mixture of (i)-(ii),
   and
   a mineral inert comprising magnesium oxide with a content by weight of at least 95%, calcium oxide with a content by weight below 2.5% and the mineral inert further comprising silicon dioxide with a content by weight below 1%, and iron (III) oxide and aluminum oxide each with a content by weight below 0.04%;
wherein said solid mixture comprises said solid composition in powder form in an amount by weight from 5% to 30% and said mineral inert in an amount by weight from 70% to 95%.

2. The solid mixture according to claim 1, wherein:
   said castor oil is additive E484, and
   said at least one vegetable olein is chosen from the group consisting of
   oleic acid,
   linoleic acid,
   linolenic acid, a triglyceride of oleic acid [$(C_{17}H_{33}COO)_3C_3H_5$]—triolein, a vegetable oil and a mixture of said oleic acid, linoleic acid, linolenic acid, triglyceride of oleic acid.

3. The mixture according to claim 1, wherein said carrier or support in powder form is present in said solid composition in an amount by weight from 20% to 50%, with respect to weight of the solid composition; and wherein said at least one emulsifier which is incorporated or adsorbed or absorbed or applied on the outer surface is chosen from the group consisting of (i), (ii), and (iii), and is present in said solid composition in an amount by weight from 80% to 50%, with respect to weight of the solid composition.

4. The solid mixture according to claim 1, wherein the carrier or support comprises at least one inorganic substrate chosen from the group consisting of:

silica;
bentonites;
zeolites;
sepiolite; and
perlite.

5. The solid mixture according to claim 1, wherein the carrier or support comprises at least one vegetable substrate chosen from the group consisting of:

corn cob or corn fiber;
broad bean fiber; and
pea fiber, wood fiber or grape seed.

6. The solid mixture according to claim 1, wherein said mixture comprises said solid composition in powder form in an amount by weight of 10%, and said mineral inert in an amount by weight of 90%.

7. An animal feed comprising the solid mixture according to claim 1.

8. A method comprising:

preparing an animal feed in solid form comprising the solid mixture according to claim 1, further comprising liquid and/or solid nutritive substances.

9. The mixture according to claim 3, wherein said carrier or support in powder form is present in said solid composition in an amount by weight from 30% to 40%, with respect to the weight of the solid composition.

10. The mixture according to claim 3, wherein said at least one emulsifier is present in said solid composition in an amount by weight from 70% to 60%, with respect to the weight of the solid composition.

11. The solid mixture according to claim 4, wherein the silica is a colloidal silica.

12. The solid mixture according to claim 11, wherein the colloidal silica is at least one member chosen from the group consisting of E551a and E551b.

13. The solid mixture according to claim 4, wherein the sepiolite is a sepiolite E562.

14. The solid mixture according to claim 4, wherein the perlite is a perlite E599.

15. The solid mixture according to claim 4, wherein said at least one inorganic substrate has an average granulometric distribution from 50 to 250 microns, for at least 95% of said at least one inorganic substrate.

16. The solid mixture according to claim 15, wherein the average granulometric distribution is from 100 to 200 microns, for at least 95% of said at least one inorganic substrate.

17. The solid mixture according to claim 5, wherein said at least one vegetable substrate has an average granulometric distribution from 50 to 250 microns, for at least 95% of said at least one vegetable substrate.

18. The solid mixture according to claim 17, wherein the average granulometric distribution is from 100 to 200 microns, for at least 95% of said at least one vegetable substrate.

* * * * *